(12) United States Patent
Kratzsch et al.

(10) Patent No.: US 9,500,491 B2
(45) Date of Patent: Nov. 22, 2016

(54) METHOD FOR POSITION DETERMINATION

(71) Applicant: Audi AG, Ingolstadt (DE)

(72) Inventors: Claudia Kratzsch, Ingolstadt (DE);
Sebastian Engel, Ingolstadt (DE);
Hendrik Rössler, Ingolstadt (DE)

(73) Assignees: AUDI AG, Ingolstadt (DE);
VOLKSWAGEN AG, Wolfsburg (DE)

( * ) Notice: Subject to any disclaimer, the term of this patent is extended or adjusted under 35 U.S.C. 154(b) by 181 days.

(21) Appl. No.: 13/673,512

(22) Filed: Nov. 9, 2012

(65) Prior Publication Data
US 2013/0124083 A1 May 16, 2013

(30) Foreign Application Priority Data

Nov. 10, 2011 (DE) .................... 10 2011 118 161

(51) Int. Cl.
*G01C 21/00* (2006.01)
*G01C 21/36* (2006.01)

(52) U.S. Cl.
CPC ....... *G01C 21/3602* (2013.01); *B60W 2550/22* (2013.01); *B60W 2550/402* (2013.01)

(58) Field of Classification Search
CPC ............ G01C 21/3423; G01C 21/3605; G01C 21/3602
USPC ........................... 701/400–541; 340/988–996
See application file for complete search history.

(56) References Cited

U.S. PATENT DOCUMENTS

| | | | | |
|---|---|---|---|---|
| 5,844,505 A | * | 12/1998 | Van Ryzin | ......... G01C 21/3602 340/905 |
| 5,874,905 A | * | 2/1999 | Nanba et al. | .............. 340/995.2 |
| 6,169,572 B1 | | 1/2001 | Sogawa | |
| 6,381,536 B1 | * | 4/2002 | Satoh et al. | .................. 701/431 |
| 6,393,360 B1 | | 5/2002 | Ma | |
| 6,472,977 B1 | * | 10/2002 | Pochmuller | ............ B60K 35/00 340/425.5 |
| 6,560,529 B1 | * | 5/2003 | Janssen | .................. G01C 21/28 340/988 |
| 8,781,733 B2 | | 7/2014 | Stachlin et al. | |
| 2001/0051850 A1 | * | 12/2001 | Wietzke | ................. G01C 21/36 701/408 |
| 2004/0215377 A1 | | 10/2004 | Yun | |
| 2008/0056535 A1 | | 3/2008 | Bergmann et al. | |

(Continued)

FOREIGN PATENT DOCUMENTS

| | | |
|---|---|---|
| CN | 1577319 A | 2/2005 |
| CN | 101159014 A | 4/2008 |

(Continued)

OTHER PUBLICATIONS

Chinese Search Report issued by the Chinese Patent Office together with a translation thereof.

*Primary Examiner* — Muhammad Shafi
(74) *Attorney, Agent, or Firm* — Henry M. Feiereisen LLC

(57) ABSTRACT

A method for position determination, in particular of a motor vehicle, includes optically capturing an object having a known geographic position and matching the geographic position of the object with stored map data. The object may be a road sign having distance information, which is optically recognized at the vehicle. The distance information is subsequently evaluated using optical character recognition.

9 Claims, 2 Drawing Sheets

(56) References Cited

U.S. PATENT DOCUMENTS

| | | | | |
|---|---|---|---|---|
| 2009/0140887 | A1* | 6/2009 | Breed | G01C 21/165 |
| | | | | 340/990 |
| 2010/0191465 | A1* | 7/2010 | Noll et al. | 701/210 |
| 2010/0305846 | A1* | 12/2010 | Tachihana | G01C 21/3605 |
| | | | | 701/533 |
| 2011/0054716 | A1* | 3/2011 | Stahlin | G01C 21/28 |
| | | | | 701/1 |

FOREIGN PATENT DOCUMENTS

| | | |
|---|---|---|
| CN | 101929866 A | 12/2010 |
| DE | 197 23 963 A1 | 12/1997 |
| DE | 197 36 774 A1 | 2/1999 |
| DE | 101 49 206 A1 | 2/2003 |
| DE | 10 2004 013 440 A1 | 10/2005 |
| DE | 10 2007 023 765 A1 | 11/2008 |
| DE | 102009008959 | 9/2009 |
| DE | 10 2009 045 326 A1 | 4/2011 |
| GB | 2 373 117 | 9/2002 |
| JP | 2004122805 A | 4/2004 |
| JP | 2010 266 383 A | 11/2010 |

* cited by examiner

METHOD FOR POSITION DETERMINATION

CROSS-REFERENCES TO RELATED APPLICATIONS

This application claims the priority of German Patent Application, Serial No. 10 2011 118 161.3, filed Nov. 10, 2010, pursuant to 35 U.S.C. 119(a)-(d), the content of which is incorporated herein by reference in its entirety as if fully set forth herein.

BACKGROUND OF THE INVENTION

The present invention relates to a method for position determination, in particular of a motor vehicle, wherein an object with a known geographic position is optically captured and the geographic position of the object is matched with stored map data.

The invention also relates to a driver assistance system configured to carry out the method for position determination, and to a motor vehicle with such driver assistance system.

The following discussion of related art is provided to assist the reader in understanding the advantages of the invention, and is not to be construed as an admission that this related art is prior art to this invention.

Comfort systems, safety systems and driver assistance systems for motor vehicle are known in the art, which require an exact position determination of the motor vehicle. Reference is made here, for example, to driver assistance system which include a vehicle-to-vehicle, communication platform which is used to warn a following road user of a local danger, for example a location of an accident. Other examples are a predictive light control, which is controlled before the motor vehicle approaches a tunnel so as to predictively adapt the visibility conditions, or a driver assistance system with a predictive gear selection, which sets a suitable gear of a transmission when approaching a curve.

The position of the vehicle is typically determined with a satellite-based positioning system, in particular a GPS system (Global Positioning System). The accuracy of the position determination is limited to about 10 m due to disturbances in the atmospheric radiation, multipath propagation or clock errors in the satellites.

It would therefore be desirable and advantageous to obviate prior art shortcomings and to provide an improved method for position determination, in particular of a motor vehicle, which significantly increases the precision of the position determination.

SUMMARY OF THE INVENTION

According to one aspect of the present invention, a method for determining a position of a motor vehicle includes optically capturing at the vehicle an object having a known geographic position and distance information, with the distance information showing a relative distance to a first reference point having a known geographic position, matching the geographic position of the object with map data stored on a digital road map, optically recognizing the object at the vehicle and evaluating the distance information using optical character recognition, matching the first reference point with a second reference point represented by the map data of the digital road map, and determining the position of the motor vehicle when the first reference point and the second reference point correspond to the same geographic position.

According to another aspect of the present invention, a driver assistance system for a motor vehicle includes a storage medium storing data of a digital road map, and an optical capture unit for capturing a capture region in front of the motor vehicle. The capture region includes a object, for example a road sign, having a known geographic position and distance information, with the distance information showing a relative distance to a first reference point having a known geographic position. The driver assistance system further includes an evaluation unit receiving from the optical capture unit optically captured image data, wherein the evaluation unit is configured to optically recognize the object using image recognition and evaluate the distance information using optical character recognition, match the first reference point with a second reference point represented by the map data of the digital road map, and determine a position of the motor vehicle when the first reference point and the second reference point correspond to the same geographic position.

According to another aspect of the present invention, a driver assistance system includes the aforedescribed driver assistance system.

Many roads, in particular country roads, federal highways and freeways have road signs with distance information erected on the side of the road. According to the invention, the road signs are automatically captured and recognized by the vehicle. The indicated distance information is evaluated using suitable optical character recognition. The geographic position of the road sign and hence also the position of the motor vehicle is determined by way of a match with stored map data. Because the road signs with distance information can be found along the roads at regular intervals of, for example, 500 m, the position of the vehicle can be continuous determined or checked while driving. In addition, only modifications on the vehicle are necessary for implementing the method for position determination, and the already existing road signs can be readily used for the position determination.

The distance information may show a relative distance to a first reference point, for example a freeway entrance or a freeway exit or a town center. For determining the position of the motor vehicle, a second reference point, which is obtained from a digital road map, in particular from a navigation or driver assistance system of the motor vehicle, is correlated with the first reference point. When the actual first reference point and the second reference point of the digital road map correspond to the same geographic position, the position of the motor vehicle is determined. For example, when the first and second reference points correspond to the same freeway entrance or exit, or to the start of the same route, the position of the motor vehicle is determined. Errors in the position determination of the motor vehicle can then be safely minimized by checking the correspondence between the first reference point and the second reference point.

According to an advantageous feature of the present invention, the distance information may show the relative distance to the first reference point along a predetermined route. For example, because the road sign may display as distance information the remaining distance to the town center of the town ahead. Alternatively, the relative distance from the first reference point may also be displayed, which defines the beginning of a freeway. The actual route is matched and associated with a corresponding virtual route of the digital road map. Since the scale of the digital road map is known, the position of the motor vehicle is can be determined based on the captured and read-out distance information.

According to another advantageous feature of the present invention, the position of the motor vehicle on the digital road map may be displayed on a dedicated display unit, for example a display integrated in an instrument panel of the motor vehicle. Advantageously, the position of the motor vehicle may be outputted continuously on the digital road map during travel so as to provide a driver with the best information.

According to another advantageous feature of the present invention, the road sign may be captured during driving with an optical capture unit which has a capture region directed in the driving direction and which may capture at least a region near the edge of the road where road signs can typically be found. According to another advantageous feature of the present invention, the evaluation of the image data generated by the optical capture unit may be limited to data of the region near the edge of the road, which reduces the computing time so that the method can be executed quickly and reliably.

According to another advantageous feature of the present invention, the road sign may be captured during driving at a first time instance and the position of the motor vehicle may be determined at a second time instance. The second time instance is defined by the time when the captured road sign leaves the capture region of the optical capture unit oriented in the direction of travel. This can be automatically recognized, in particular with suitable image recognition software. Errors in the position determination can then be minimized by determining the position of the motor vehicle at the second time instance when the motor vehicle is safely in close proximity of the road sign.

According to another advantageous feature of the present invention, the capture region of the optical capture unit may be captured continuously and sequentially. The image data may thus be generated in form of video sequences displaying a corresponding environment of the vehicle. A virtual position of the captured road sign in the image data may be continuously checked, in particular between the first time instance and the second time instance, so as to eliminate to the greatest possible extent sources for errors in the position determination.

According to another advantageous feature of the present invention, the position of the motor vehicle may be additionally determined with satellite-based positioning, for example with a conventional positioning system, such as the GPS system (Global Positioning System). Advantageously, the position of the motor vehicle may initially be coarsely determined with the satellite-based positioning, with the position subsequently being specified with greater precision using the method of the invention. For example, the position of the motor vehicle may initially be determined with the satellite-based positioning to the extent that a route or a road, in particular a freeway, is determined on which the motor vehicle is traveling. When the road sign with the distance information is subsequently optical captured, recognized and evaluated, then it is known to which first reference point the distance information is related to, because the first reference point is typically associated with the corresponding route. For example, freeways have road signs with distance information which show the distance from the beginning of the respective freeway.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
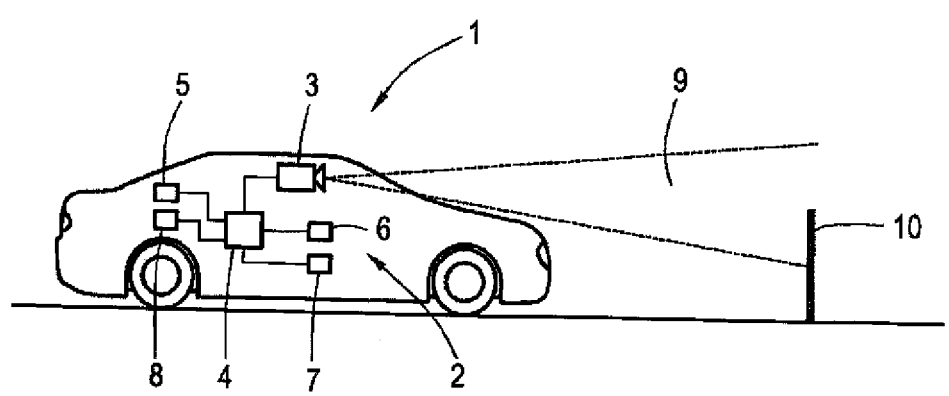
FIG. 1 shows schematically a motor vehicle according to the present invention with a driver assistance system.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic diagram of a motor vehicle 1 with a driver assistance system 2. The driver assistance system 2 includes an optical capture unit 3 which is oriented in the driving direction, so that a capture region 9 in front of the vehicle can be captured. In addition, a region near the edge of the road is located inside the capture region 9, so that a road sign 10 located in the region near the edge of the road can be captured by the optical capture unit 3.

The optical capture unit 3 is operatively connected with an evaluation unit 4, so that optically captured image data can be transmitted from the optical capture unit 3 to the evaluation unit 4.

Image recognition and character recognition are implemented in the evaluation unit 4 with suitable software. The evaluation unit 4 is furthermore connected with a storage medium 5 on which data of a digital road map are stored. The digital road map K can be displayed on a display unit 6 which is implemented, for example, as a display or monitor and integrated in the instrument panel of the motor vehicle 1.

The driver assistance system 2 also includes a control unit 7 with which parameters of the driving conditions can be automatically changed. For example, the motor vehicle 1 may be automatically decelerated by the control unit 7 when a dangerous situation has been detected, or a yaw angle of the motor vehicle 1 may be changed for initiating an evasive action.

Furthermore, a receiver 8 is provided which is operatively connected with the evaluation unit 4. The receiver 8 is configured to receive satellite-based signals which can be transmitted to the evaluation unit 4 for evaluation. A position of the motor vehicle 1 can be determined in this way. In particular, in a preferred exemplary embodiment of the invention, the receiver 8 is constructed as a GPS receiver (Global Positioning System).

In addition, the driver assistance system 2 is configured as a navigation system and has an (unillustrated) input unit allowing, for example, a destination to be preset. With the evaluation unit 4 and based on the stored digital road map, a route to the preset destination from the present location of the motor vehicle 1 can be determined. This route can be displayed on the display unit 6 together with a suitable section of the digital road map to convey information to the driver. In addition, driving instructions may be outputted on the display unit 6, which instruct for example the driver to initiate a turn.

In addition, the driver assistance system 2 has an (unillustrated) communication platform which enables communication with similarly equipped vehicles of other road users. In this way, another vehicle following the motor vehicle 1 can be alerted of a dangerous situation, for example sudden braking, traffic congestion or an accident.

Figure 2:
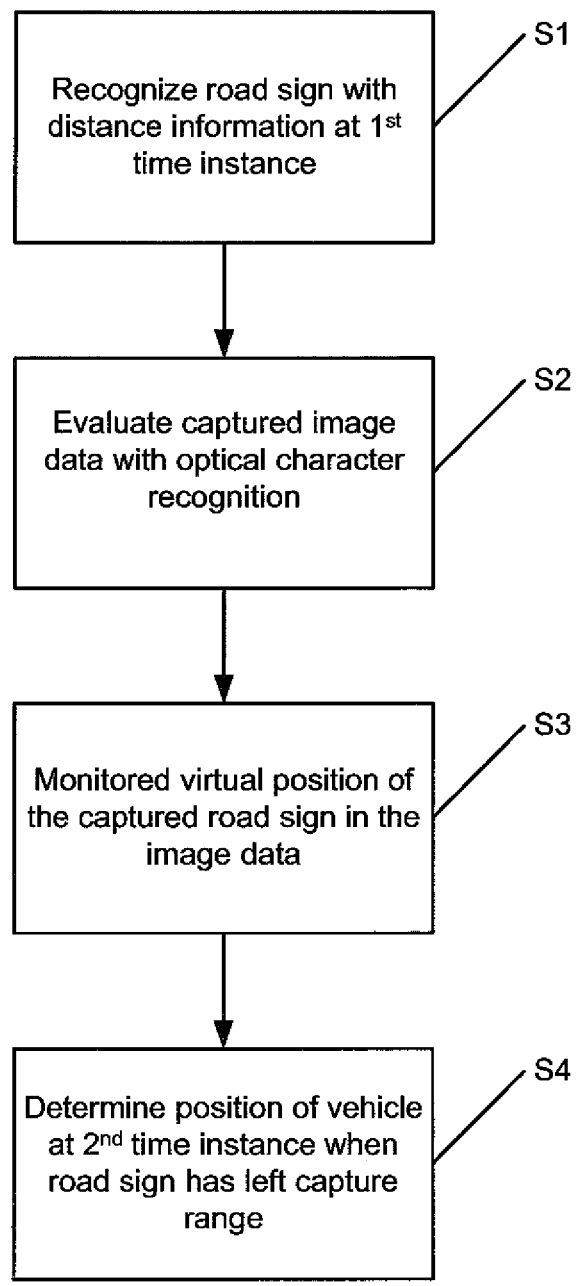
FIG. 2 shows schematically a flow diagram of a method according to the invention for position determination of the motor vehicle.

FIG. 2 shows schematically in form of a flow diagram a method for determining the position of the motor vehicle 1. In a first method step S1, the image data which are continuously captured by the optical capture unit 3 during driving are evaluated. For this purpose, at least the image data corresponding to the region near the edge of the road are scanned row-wise and/or column-wise so as to recognize any road sign 10. When the road sign 10 with distance information is recognized in the first method step S1, the captured image data are evaluated with optical character recognition in a subsequent method step S2, wherein the distance information is read out. In addition, in a preferred exemplary embodiment of the invention, the recognized road sign 10 is displayed on the display unit 6. The distance information indicates, for example, the distance to a town boundary or a town center in a nearby town or city. The distance information is therefore information of a relative distance to a first reference point which is defined, for example, by the geographic position of the town center of the nearby town or city or by a beginning or an end of a freeway or federal highway.

In a third method step S3, the virtual position of the captured road sign 10 is monitored in the image data that are continuously generated by the capture unit 3 during driving. The position of the motor vehicle 1 is determined only when the road sign 10 leaves the capture region 9 of the optical capture unit 3 and can hence no longer be detected in the image data. The position of the motor vehicle can thus be determined with the greatest possible accuracy by minimizing a distance between the motor vehicle 1 and the road sign 10. The road sign is captured and recognized in the first method step S1 at a first time instance; however, without the position of the motor vehicle 1 is determined not before the motor vehicle 1 reaches the road sign 10 at a second time instance and the road sign 10 has left the capture region E oriented in front of the vehicle.

The road sign 10 has a known geographic position which is defined by the distance information relative to the first reference point. For correctly determining the position of the motor vehicle 1, the distance information and the first reference point are matched with the data of the stored digital road map. The virtual routes and the associated virtual second reference points of the digital road map are then determined and compared with the first reference point. When the first reference point corresponds to the second reference point, i.e., when the first and the second reference points correspond to the same geographic position, the route on which the motor vehicle 1 is located is uniquely associated with a route of the stored digital road map. The position of the motor vehicle 1 can then be determined based on the digital road map, because the distance traveled or to be traveled along the route corresponding to the distance information is known. Preferably, the position of the motor vehicle 1 determined in this manner is displayed on the display unit 6.

The position of the motor vehicle 1 is additionally determined using satellite-based positioning. Corresponding satellite signals are received by the receiver 8 and transmitted to the evaluation unit 4 for evaluation. This is done in particular within the context of a GPS system. Satellite-based positioning can be used in particular for coarsely determining the position before the method of the invention is carried out. This has the advantage that at least the correct road or route on which the motor vehicle is located is determined based on the digital road map. The first reference point is then already known, because this point is typically associated with the road or route on which the motor vehicle 1 is located.

The second reference point that corresponds to the first reference point can thus be readily found in the data of the digital road map based on the satellite-based positioning, and the position of the motor vehicle 1 can thus be determined with the aforedescribed method.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for determining a position of a motor vehicle, comprising:
    determining on a digital road map the position of the motor vehicle on a roadway by way of satellite-based positioning (GPS), wherein the roadway has at least one road sign located at a known relative distance from a reference point having a known geographic position and the roadway is an interstate highway,
    determining on the digital map a virtual route to be traveled by the motor vehicle to the reference point along the roadway,
    optically capturing with a camera located in or on the vehicle the at least one road sign having distance information showing the relative distance, wherein the road sign is captured, while driving, at a first time instance and the position of the motor vehicle is determined at a second time instance, when the road sign leaves the capture region at the second time instance,
    evaluating the at least one road sign using optical character recognition to determine the relative distance to the reference point,
    matching the determined relative distance to the reference point with map data stored on the digital road map by taking into account the position of the motor vehicle determined by GPS and the travel along the virtual route, and
    positioning the motor vehicle on the digital road map when the distance from the position of the motor vehicle to the reference point on the digital road map is identical to the determined relative distance.

2. The method of claim 1, wherein the determined position of the motor vehicle is displayed on the digital road map.

3. The method of claim 1, wherein the camera has a capture region that is oriented in a driving direction of the motor vehicle and includes at least one region near an edge of a road, wherein the at least one region is captured during driving and evaluated using optical character recognition.

4. The method of claim 1, wherein the camera continuously captures the capture region and continuously generates image data, wherein a virtual position of the captured road sign in the image data is continuously checked between the first time instance and the second time instance.

5. The method of claim 1, wherein the distance information on the road sign represents a distance to a starting point of an interstate highway.

6. The method of claim 1, wherein the distance information on the road sign represents a distance to a city center.

7. The method of claim 1, wherein the distance information on the road sign represents a distance to an interstate highway entrance ramp or to an interstate highway exit ramp.

8. A driver assistance system for a motor vehicle, comprising:
   a storage medium storing map data of a digital road map,
   a satellite-based positioning (GPS) receiver determining a position of the motor vehicle on a roadway and a virtual route to be traveled by the motor vehicle along the roadway, wherein the roadway has at least one road sign located at a known relative distance from a reference point having a known geographic position and the roadway is an interstate highway,
      an optical capture unit for optically capturing a capture region in front of the motor vehicle, said capture region including the at least one road sign having distance information showing the relative distance, wherein the road sign is captured, while driving, at a first time instance and the position of the motor vehicle is determined at a second time instance, when the road sign leaves the capture region at the second time instance, and
   an evaluation unit configured to
      evaluate the optically captured distance information using optical character recognition to determine the relative distance to the reference point,
      match the determined relative distance to the reference point with map data stored on the digital road map by taking into account the position of the motor vehicle determined by GPS and the travel along the virtual route, and
      position the motor vehicle on the digital road map when the distance from the position of the motor vehicle to the reference point on the digital road map is identical to the determined relative distance.

9. A motor vehicle comprising a driver assistance system with:
   a storage medium storing map data of a digital road map,
   a satellite-based positioning (GPS) receiver determining a position of the motor vehicle on a roadway and a virtual route to be traveled by the motor vehicle along the roadway, wherein the roadway has at least one road sign located at a known relative distance from a reference point having a known geographic position and the roadway is an interstate highway,
      an optical capture unit for optically capturing a capture region in front of the motor vehicle, said capture region including the at least one road sign having distance information showing the relative distance, wherein the road sign is captured, while driving, at a first time instance and the position of the motor vehicle is determined at a second time instance, when the road sign leaves the capture region at the second time instance, and
   an evaluation unit configured to
      evaluate the optically captured distance information using optical character recognition to determine the relative distance to the reference point,
      match the determined relative distance to the reference point with map data stored on the digital road map by taking into account the position of the motor vehicle determined by GPS and the travel along the virtual route, and
      position the motor vehicle on the digital road map when the distance from the position of the motor vehicle to the reference point on the digital road map is identical to the determined relative distance.

* * * * *